United States Patent [19]
Rollinson

[11] Patent Number: 5,573,310
[45] Date of Patent: Nov. 12, 1996

[54] WHEEL OR ENDLESS TRACK

[75] Inventor: Phillip J. Rollinson, West Perth, Australia

[73] Assignee: Altrack Limited, Australia

[21] Appl. No.: 198,541

[22] Filed: Feb. 17, 1994

Related U.S. Application Data

[63] Continuation of Ser. No. 806,738, Dec. 12, 1991, abandoned, which is a continuation of Ser. No. 380,909, Jul. 17, 1989, Pat. No. 5,078,454.

[30] Foreign Application Priority Data

Jul. 19, 1988 [AU] Australia ................................. PI9369
Sep. 16, 1988 [AU] Australia ................................. PJ0444

[51] Int. Cl.⁶ ............................................. B60C 7/08
[52] U.S. Cl. ............................................. 301/43; 301/44.2
[58] Field of Search ........................... 305/7, 19, 51, 305/54; 301/5.1, 41.1, 43, 44.1, 44.2, 44.3, 44.4; 152/300, 306, 308, 309; 404/121, 122, 124

[56] References Cited

U.S. PATENT DOCUMENTS

| | | |
|---|---|---|
| 1,365,539 | 1/1921 | Pepple . |
| 1,414,252 | 4/1922 | Brubaker . |
| 1,421,029 | 6/1922 | Roe ................................. 152/309 |
| 1,455,844 | 5/1923 | Lang . |
| 1,553,018 | 9/1925 | Barth ................................. 152/309 |
| 2,807,304 | 9/1957 | Pellegrino . |
| 2,984,520 | 5/1961 | Wadell . |
| 4,385,652 | 5/1983 | Frank ................................. 305/54 X |
| 5,078,454 | 1/1992 | Rollinson ................................. 301/44.1 |
| 5,154,490 | 10/1992 | Burns ................................. 301/44.3 |

FOREIGN PATENT DOCUMENTS

| | | |
|---|---|---|
| 429855 | 10/1911 | France . |
| 431602 | 11/1911 | France . |
| 461247 | 8/1913 | France ................................. 152/309 |
| 207632 | 12/1923 | United Kingdom . |
| 565646 | 11/1944 | United Kingdom ................................. 301/43 |

OTHER PUBLICATIONS

English Translation of Patent No. 429,855 of France, Published Oct. 3, 1911.

Primary Examiner—Russell D. Stormer
Attorney, Agent, or Firm—Handal & Morofsky

[57] ABSTRACT

A ground engaging tire assembly in the form of a wheel for a vehicle, comprising a rim (11) and a plurality of ground engaging elements (13) mounted on the rim. Each ground engaging element (13) comprises a hollow body (31) having an inner face (32) in engagement against the rim and an outer face (33) for contacting the ground. The hollow body (31) also has side faces (34) extending between the inner and outer faces. The side faces (34) are constructed to be resiliently flexible for deflection under normal load conditions thereby to provide cushioning for the vehicle. The ground engaging elements are so positioned on the rim that confronting side faces of neighboring elements provide lateral support for each other when deflecting under load.

6 Claims, 4 Drawing Sheets

WHEEL OR ENDLESS TRACK

CROSS-REFERENCE TO RELATED APPLICATIONS

This application is a continuation of U.S. patent application Ser. No. 07/806,738 of Rollinson filed Dec. 12, 1991 and entitled "WHEEL OR ENDLESS TRACK", now abandoned, which, in turn, is a continuation of U.S. patent application Ser. No. 07/380,909 of Rollinson filed Jul. 17, 1989, and entitled "WHEEL OR ENDLESS TRACK", now U.S. Pat. No. 5,078,454, issued Jan. 7, 1992.

FIELD OF THE INVENTION

THIS INVENTION relates to a ground engaging means for vehicles and is particularly suitable as a wheel or endless track for work vehicles such as earthworking machines, agricultural machines, military vehicles, and vehicles used in rough terrain.

BACKGROUND OF THE INVENTION

Wheels or endless tracks which are resilient in character have certain performance benefits and in particular they provide cushioning so as to offer some resistance to vibration and jarring. While pneumatic tires provide cushioning, they do have the disadvantage of being susceptible to puncturing.

There have been various proposals to provide wheels or endless tracks which can resiliently flex to provide cushioning but which are not pneumatic. One such proposal is disclosed in United Kingdom Patent No. 857439 which is directed to a vehicle ground engaging means in the form of a wheel having a plurality of pieces of flexible tubing circumferentially spaced around its periphery and extending crosswise of the direction of travel. Although the provision of the flexible tubing is intended to provide the wheel with some cushioning characteristics, it is believed that tubing would not perform altogether satisfactorily in practice. This is because the side wall strength required of the tubing to avoid collapsing or excessive deformation under normal load conditions would be such that the tubing would in all probability not flex sufficiently to provide satisfactory cushioning.

SUMMARY OF THE INVENTION

The present invention seeks to provide a ground engaging means for vehicles which is not pneumatic but which can flex resiliently under load to provide some cushioning.

In one form the invention resides in a ground engaging means for a vehicle comprising a base and a plurality of ground engaging elements mounted on the base, each ground engaging element comprising a hollow body having an inner face in engagement against the base, an outer face for contacting the ground, and side faces extending between the inner and outer faces, the side faces being constructed to be resiliently flexible thereby to deflect under normal load conditions, the ground engaging elements being so positioned on the base that confronting side faces of neighbouring elements provide lateral support for each other when deflecting under load.

Preferably, neighbouring ground engaging elements are positioned in abutting relationship.

In the case of a wheel, said base may be of any suitable form such as the rim of the wheel or a band adapted to be permanently or removably fitted onto the rim.

In the case of an endless track, said base may comprise a flexible endless band passing around end rollers of the track.

Preferably, the ground engaging elements are removably mounted on said base. This allows individual elements to be removed and replaced in the event of damage.

Preferably the ground engaging elements are elongated.

Preferably at least some of the side faces of the ground engaging element are of angular construction comprising inner and outer portions which are integral with each other and which meet at a longitudinal junction.

Preferably, when the ground engaging elements are mounted on the base, the inner portions of confronting side faces of neighbouring elements abut each other thereby to provide said lateral support.

Preferably, said outer portions of the side faces of each element are inclined inwardly to provide a lug at the outer region of the ground engaging element to facilitate traction in soft ground conditions.

In one arrangement, each ground engaging element extends transversely of the direction of travel of the wheel or endless track and is preferably configured into a V formation so that the elements create a chevron pattern when mounted on said base.

Preferably, the outer face of each ground engaging element is provided with a tread formation.

Cooling fins may be accommodated within the hollow region of the body if desired.

While each element may be attached to said base in any suitable way, a particularly convenient form of attachment is by way of a clamping plate received within the hollow portion of the body and fixed to the base by one or more bolts which extend through the clamping plate and the inner part of the ground engaging element for connection to the base.

In one preferred form of construction, the hollow body is tubular and open at its ends.

In another form the invention resides in a ground engaging element constructed as set forth in any one or more of the preceding paragraphs.

In still another form the invention resides in a ground engaging means for a vehicle comprising base and a plurality of ground engaging elements mountable to said base, each ground engaging element comprising a hollow body and having an inner face for engagement against the base, an outer face for engagement with the ground and a plurality of side faces extending between the inner face and outer face, said side faces being constructed to be resiliently flexible for deflection under normal load conditions, the ground engaging elements being configured and positioned on the base such that side walls of each ground engaging element provide lateral support to side walls of at least four adjacent ground engaging elements.

Preferably there are five of said side faces comprising a first face, second and third faces extending in the same direction from opposite ends of the first face, and fourth and fifth faces extending from the ends of the second and third faces respectively remote from the first face, said fourth and fifth faces converging to an apex portion, wherein said first face of each ground engaging element is disposed adjacent a peripheral edge of the base and said apex portion is positioned approximately centrally on the base, the second and third faces of each ground engaging element being adjacent to corresponding faces of adjacent ground engaging elements and the fourth and fifth faces of each ground engaging element being adjacent to corresponding faces of oppositely disposed ground engaging elements.

Preferably at least some of the side faces of the ground engaging elements are provided with chamfers or grooves whereby upon assembly of the ground engaging elements on the base the chamfers or grooves define a tread pattern.

Preferably the interior of the hollow body opens onto the first face.

In another form the invention resides in a ground engaging element constructed as set forth at any one or more of the immediately preceding four paragraphs.

BRIEF DESCRIPTION OF THE DRAWINGS

The invention will be better understood by reference to the following description of two specific embodiments thereof as shown in the accompanying drawings in which.

DESCRIPTION OF PREFERRED EMBODIMENTS

Figure 1:
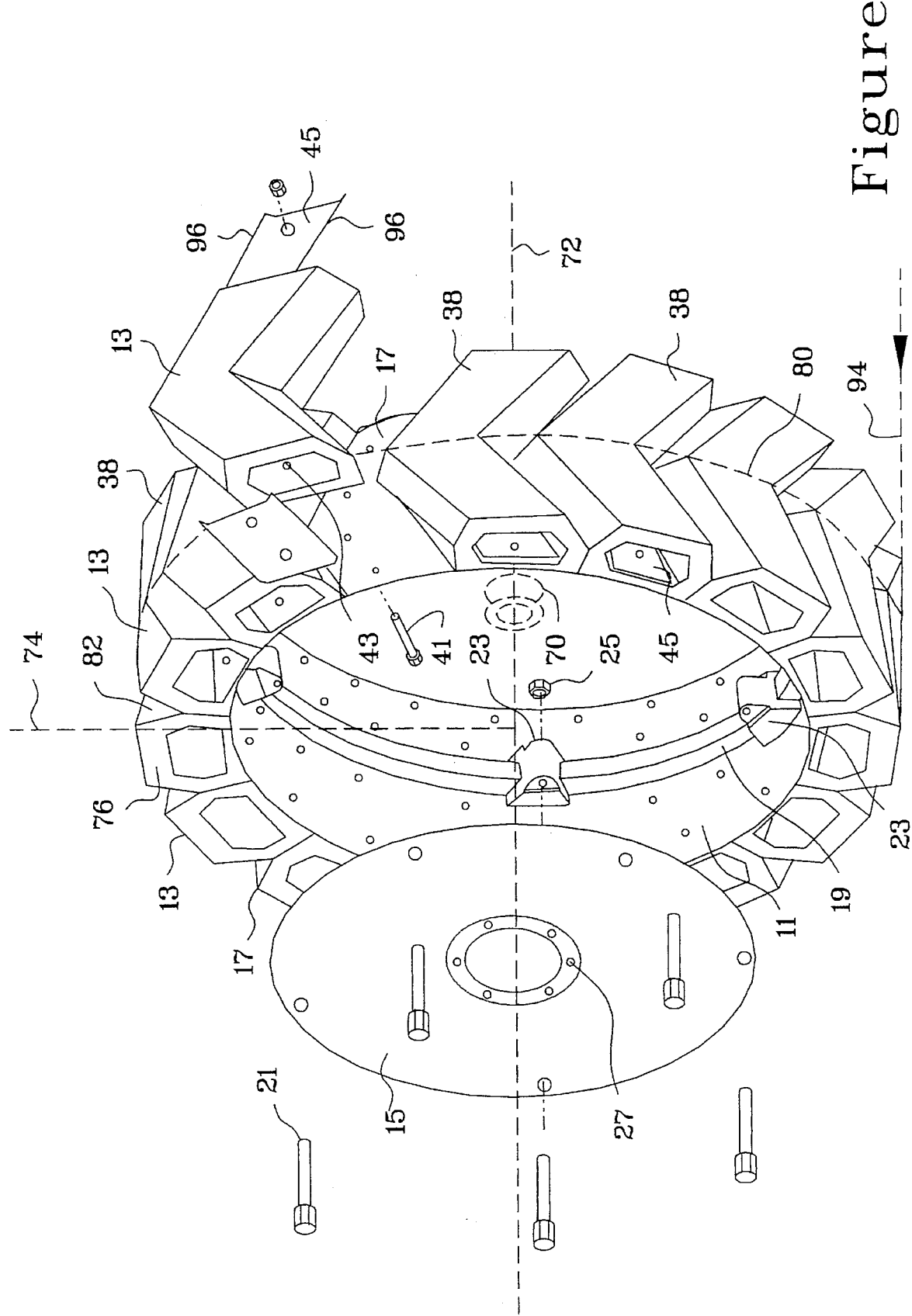
FIG. 1 is a perspective view (in partly exploded form) of a wheel according to a first embodiment.
Figure 2:
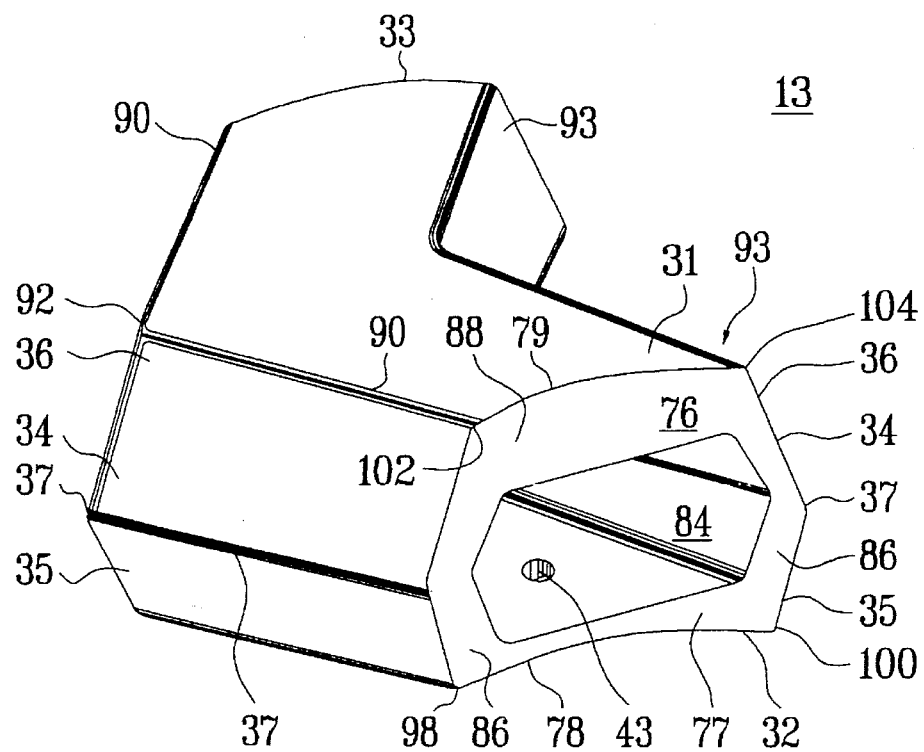
FIG. 2 is a perspective view of a ground engaging element which forms part of the wheel of FIG. 1.
Figure 3:
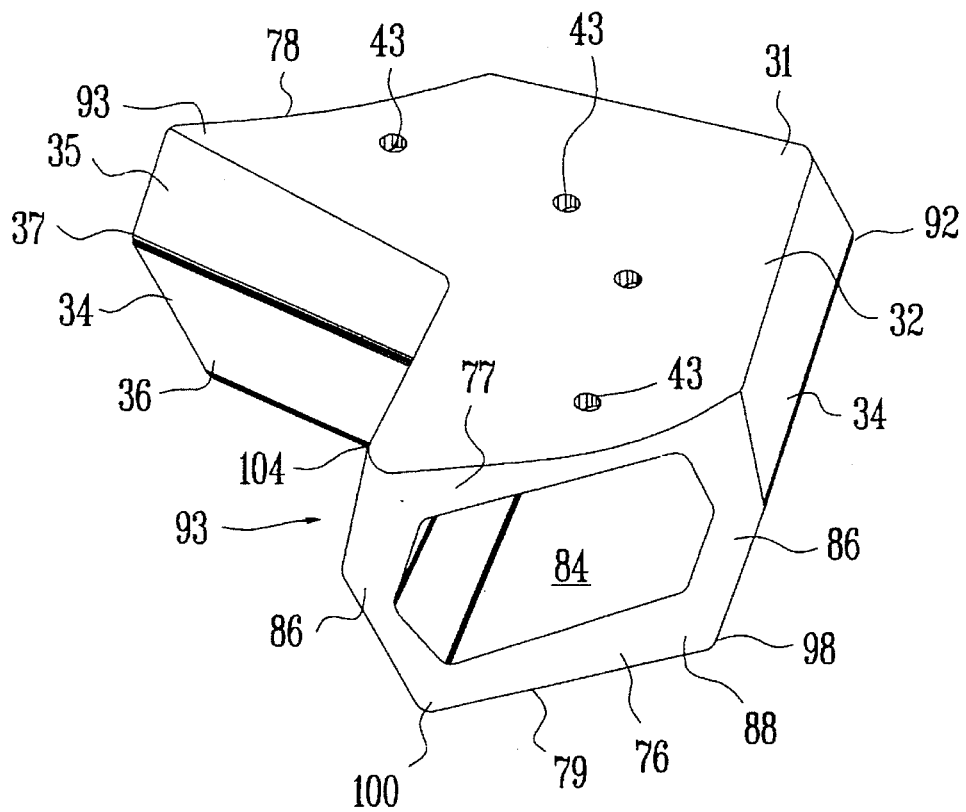
FIG. 3 is a perspective view of the underside of the ground engaging element of FIG. 2.

The first embodiment which is shown in FIGS. 1, 2 and 3 of the drawings is directed to a wheel for use on a four-wheel drive vehicle having military applications.

The wheel comprises a rim 11 having a plurality of ground engaging elements 13 mounted on the periphery of the rim. The elements 13 are formed from reinforced, resilient polymeric material such as rubber. The rim 11 includes a hub 15 adapted for mounting onto a support structure or axle carrying a wheel bearing 70 of a vehicle in conventional manner and a rigid peripheral band 17 surrounding the hub to provide a base onto which the ground engaging elements 13 can be mounted. A mounting ring 19 is provided within the band 17 and is fixed to the band. The hub 15 is releasably attached to the mounting band 19 by way of bolts 21 which can be received in mounting lugs 23 provided on the mounting ring 21 and secured in place by way of nuts 25. With this arrangement, the hub 15 can be selected to ensure that the arrangement of mounting apertures 27 in the hub correspond to the arrangement of the wheel mounting lugs on the axle of the vehicle to which the wheel is to be fitted. Bearing 70 is centered on an axis of rotation 72 of the wheel from which a radius such as 74 passes through each element 13.

Each ground engaging element 13 comprises a hollow body 31 which in this embodiment is tubular and open at its ends.

The ground engaging elements extend transversely of the direction of travel of the wheel and are configured into a V formation so as to create a chevron pattern when mounted on the wheel, as best shown in FIG. 1 of the drawings. Thus, the ground-engaging elements are symmetrically configured with a circumferentially displaced portion such that neighboring elements can interfit and interengage one with another.

The hollow body 31 of each ground engaging element comprises an inner longitudinal face 32 for engagement against the rigid band 17 of the wheel rim, an outer longitudinal face 33 for contacting the ground, and two longitudinal side faces 34 between the inner and outer faces. Each longitudinal side face 34 is of angular construction and comprises radially inner and outer longitudinal portions 35 and 36 respectively. The inner and outer longitudinal portions 35 and 36 are formed integrally with each other and meet at a longitudinal junction 37 about which the portions 35 and 36 can flex.

The outer longitudinal face 33 constitutes a discrete ground-engaging surface for each element 13 and is carried by an outer element portion 76 which has an arcuate outer profile 79 whereby a series of ground-engaging outer longitudinal faces 33 extends along a continuous circular line 80 which is centered on axis 72.

Inner longitudinal face 32 is carried on an inner element portion 77 which bears on rim 11, and has an arcuate shape 78 conforming to rim 11. Hollow body 31 has a hollow interior or ventilation cavity 84 occupying a substantial volume in the center of each element 13.

The arrangement of the inner longitudinal portions 35 of the side faces is such that when the ground engaging elements are mounted onto the rim, the inner longitudinal portions of neighbouring ground engaging elements are contiguous neighboring ground-engaging elements 13 abut along an abutment line 82 which extends from rim 11 radially outwardly between inner element portions 77 and longitudinal portions 35 which lie alongside ventilation cavity 84. In this way, the inner portions mutually support each other when deflecting under load.

Ventilation cavity 84 defines with longitudinal portions 35 and 36 of the element side walls 86 which extend between inner element portion 77 and outer element portion 76 and provide support for the latter. When stressed under ground-engagement loads, side walls 86 tend to deform outwardly by flexing or bending to transmit loads to neighboring elements through abutting surfaces 35. As drawn in FIGS. 1–3, ventilation cavity 84's width exceeds the combined widths of the side walls 86 and its radial height exceeds the combined thicknesses of outer and inner element portions 76 and 77.

Closely packed around a wheel rim, as shown in FIG. 1, the chevron-shaped ground-engaging elements 13 are tightly interengaged and interlocked. Clamping plates 45 and the abutment of neighboring elements along the inner longitudinal portions 35 hold each element 13 securely in place on the rim 11, resisting twisting forces that ground engagement may induce.

The outer longitudinal portions 36 of each ground engaging element are inclined inwardly to provide a lug formation 38 at the outer region of the ground engaging element to facilitate traction in soft ground conditions. Outer element portion 76 has a greater thickness 88 at its forward edge 90. Peaks 92 of V-shaped elements 13 occupy a leading position in the direction of travel 94, while wings 93 have a trailing position, referring to the direction of travel 94.

Although not shown in the drawings, the outer face 33 of the ground engaging element is provided with a tread formation.

The ground engaging elements 13 are removably mounted onto the rim 11 by way of fixing bolts 41 which extend through apertures 43 in the band 17 and corresponding apertures 45 formed in the tubular body 13 to engage with a clamping plate 45 received within the hollow body 13.

With this arrangement, the innermost part of the body is clamped between the clamping plate and the band 17 to secure the body in position on the rim. The clamping plate 45 is of a V formation to conform to the shape of the hollow body and has flanged edges 96 upturned to lie against the interior side walls of ventilation cavity 84.

As can be seen from FIGS. 2 and 3, the integral one-piece ground-engaging elements 13 have an outer profile which is contoured to provide inner corners 98 and 100 where inner longitudinal side face portions 35 meet inner longitudinal face 32 and with outer corners 102–104 where outer longitudinal side face portions 36 meet outer longitudinal face 33.

When the ground engaging elements are mounted onto the rim, they provide a ground contacting surface for the wheel which can resiliently flex so as to offer some resistance to shock and which is not pneumatic in nature so as not to be susceptible to puncturing. Additionally, the lugs provided by the ground engaging elements facilitate traction in soft ground conditions.

Ground-engaging outer longitudinal faces 33 of elements 13 lying on outer peripheral circle 80 define a rolling radius of the wheel. Because the leading peak 92 of one element 13 intrudes between the trailing wings 93 of its neighbor, the rolling radius, being the radius of ground contact, remains substantially constant, providing a smooth ride, substantially avoiding thumping or bumpiness induced by the bite between elements.

Figure 4:
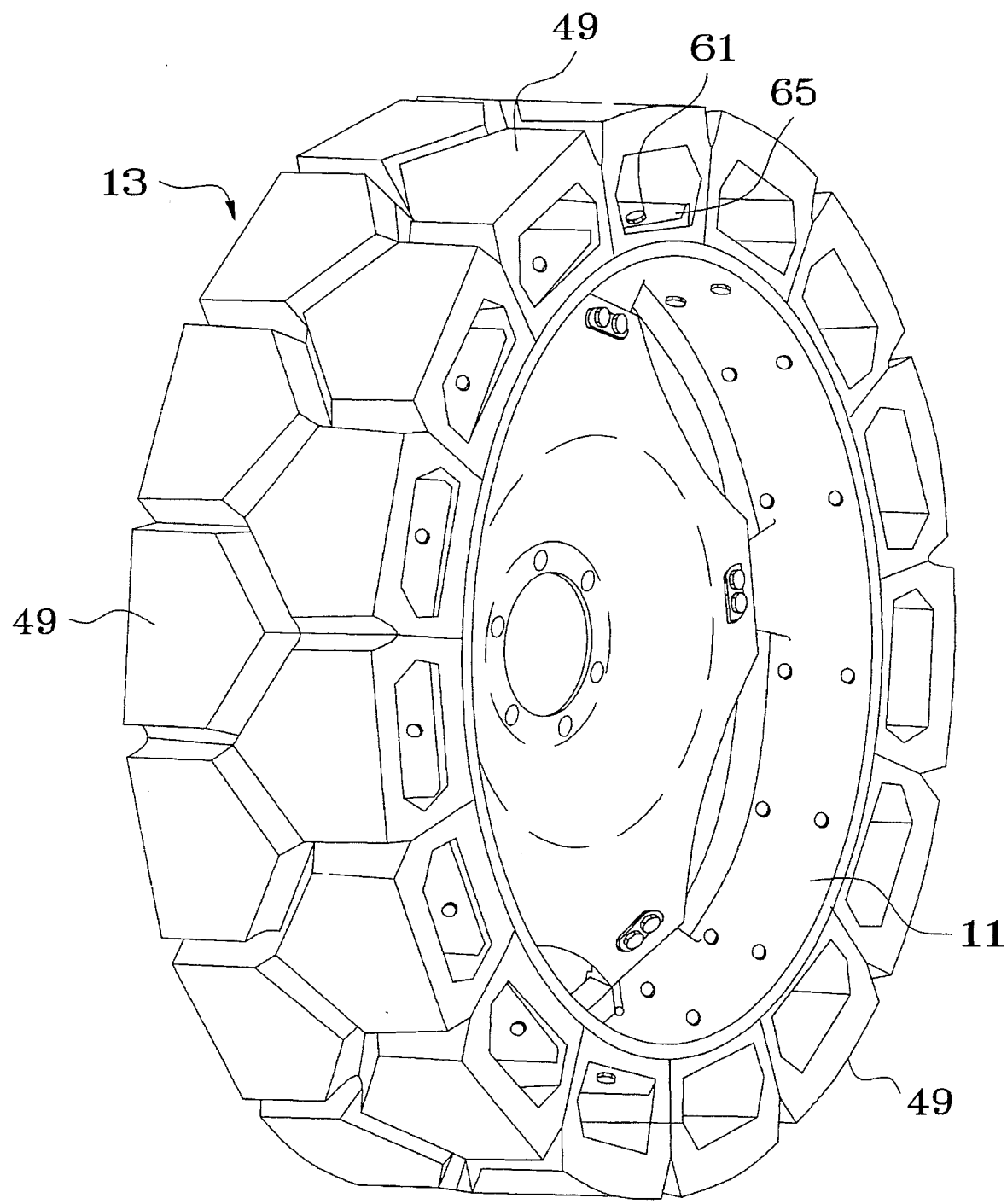
FIG. 4 is a perspective view of a wheel according to a second embodiment.
Figure 5:
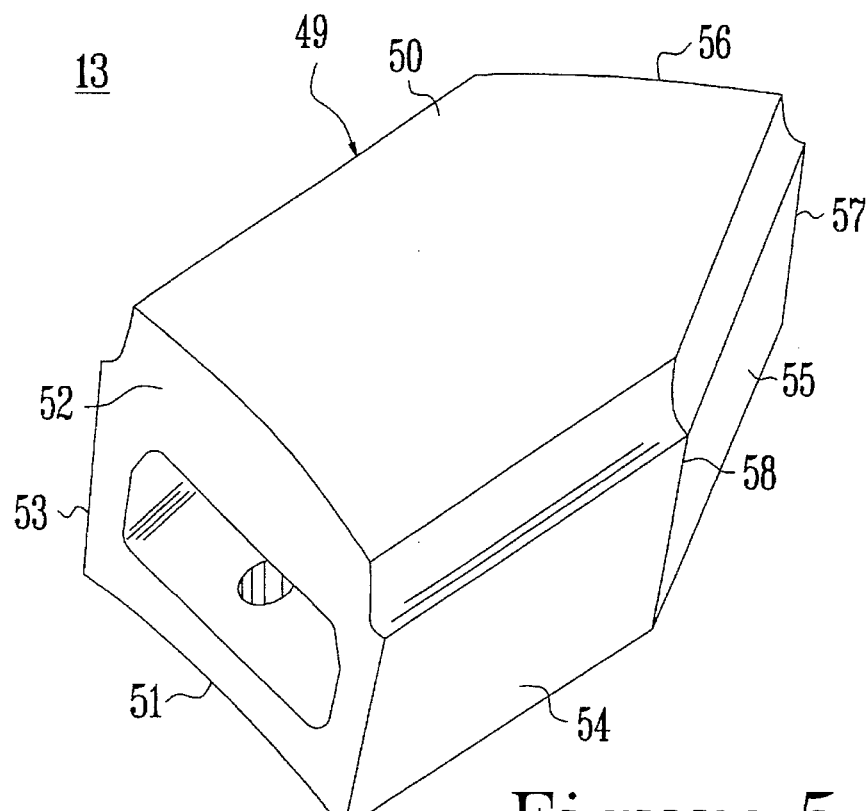
FIG. 5 is a perspective view of a ground engaging element which forms part of the wheel of FIG. 4.
Figure 6:
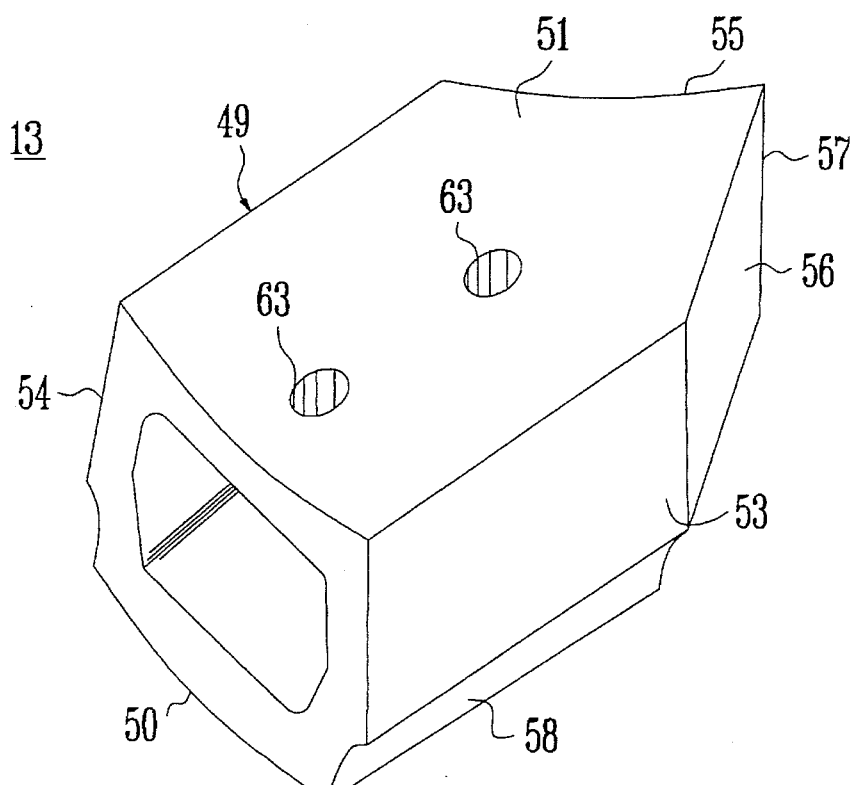
FIG. 6 is a perspective view of the underside of a ground engaging element of FIG. 5.

The second embodiment is shown in FIGS. 4, 5 and 6 and also is in the form of a wheel comprising a rim 11 having a plurality of ground engaging elements 13 mounted thereon.

Each ground engaging element 13 comprises a hollow body 49 having an outer longitudinal face 50 adapted for engagement against the ground and an inner longitudinal face 51 adapted for engagement with the base of the wheel. The outer longitudinal face and inner longitudinal face are substantially parallel with respect to each other and are spaced from each other by side faces which in the embodiment are integral with the outer and inner faces and which are arranged in a pentagonal configuration. Such side faces comprise a first face 52, second and third faces 53, 54 extending vertically and in the same direction from opposite ends of the first face, and fourth and fifth faces 55 and 56 extending from the end of the second and third faces respectively said fourth and fifth faces converging to form an apex portion 57.

The first face 52 is provided with the opening to allow access to the hollow body of each ground engaging element.

The second, third, fourth and fifth faces each comprise inner and outer portions, the latter being defined by a groove or chamfer 58.

Each ground engaging element 13 is sized such that when first face 52 is adjacent the edge of the base of the wheel, the apex portion 57 of each ground engaging element extends to a position approximately midway across the base of the wheel.

The assembled wheel comprises a first set of ground engaging elements positioned around the periphery of the wheel rim 11 with the first face 52 of each ground engaging element is positioned adjacent to one edge of the rim, and the inner portions of the second and third side faces in abutting relationship with corresponding parts of neighbouring elements.

A second set of ground engaging elements are provided on the periphery of the wheel rim 11 with the first face 52 of each ground engaging element positioned adjacent to the other edge of the rim. The first set and second set of ground engaging elements are in an offset and opposed relationship to each other such that the inner portions of the fourth and fifth faces 55, 56 of one set of ground engaging elements are in abutment with the corresponding parts of two adjacent and opposed ground engaging elements of the other set.

The grooves or chamfers 58 on the ground engaging element co-operate to provide a tread pattern to facilitate gripping with the ground.

The arrangement of the lower portions of the side faces of the ground engaging elements being in abutment results in the side faces mutually supporting each other when deflecting under normal load conditions.

Although not shown in the drawings, the outer longitudinal face of each ground engaging element can be provided with a tread formation or any other form of formation to increase grip with the ground.

The ground engaging elements, are removably mounted onto the rim 11 by way of fixing bolts 61 which extend through apertures in rim and corresponding apertures 63 formed in the inner longitudinal face 51 to engage with a clamping plate 65 received within the hollow body of each ground engaging element. With this arrangement, the inner most part of the body is clamped between the clamping plate and rim to secure the body in position on the rim. The clamping plate preferably of a configuration to conform with the shape of the interior of the hollow body. When the ground engaging elements are assembled and mounted onto the rim they provide a ground contacting surface for the wheel which can resiliently flex so as to offer some resistance to shock and which is not pneumatic in nature and thus not susceptible to puncturing. Additionally should one ground engaging element be totally ruptured, the remaining ground engaging elements will provide sufficient support to allow the vehicle to continue its journey.

It will be apparent from the foregoing that, broadly viewed, the invention provides a non-pneumatic, composite tire for a wheel having a circumference and a rotation axis, said tire comprising multiple ventilated, one-piece tire elements assemblable around said wheel circumference in interlocking relationship, each said tire element having:

a) a tubular body to extend axially across said wheel, said tubular body being symmetrically configured with a circumferentially displaced portion such that neighboring elements can interfit and interengage one with another;

b) having a radially outer, ground-engageable pad; and c) having resiliently deformable side walls supporting said pad under a ground-engaging load;

wherein said tire elements are each compressible under ground-engaging loads with radial, inward movement of said pad, and with deformation of said side walls to shed said ground-engaging load laterally to adjacent said tire elements. As may be seen from the accompanying drawings, in a preferred embodiment, the tire element is configured with a chevron-shaped profile in a plane tangential to said wheel circumference.

It should be appreciated that the scope of the invention is not limited to the scope of the two embodiments described. In particular, it should be appreciated that the invention may be applied to endless tracks for tracked vehicles in which case the ground engaging elements would be mounted onto a flexible band which passes around end rollers of the track.

I claim:

1. A non-pneumatic, composite tire for a wheel having a wheel rim, a circumference and a rotation axis, said composite tire comprising multiple, ventilated, one-piece, resilient ground-engaging tire elements assemblable around said wheel circumference in interlocking relationship, each said tire element having:

a) a tubular, hollow body to extend axially across said wheel and having ends positionable in parallel alignment with said wheel rotation axis, said tubular body being configured with a circumferentially displaced formation intermediate said ends such that the circumferentially displaced formation of one element can be accommodated between said ends of a neighboring element whereby neighboring elements can interfit and interengage one with another;
  b) having a radially inner, rim-engaging portion;
  c) having a radially outer, ground-engageable pad; and
  d) having resiliently deformable side walls supporting said outer ground-engageable pad under a ground-engaging load;

wherein said tire elements are each compressible under ground-engaging loads with radial, inward movement of said pad, and with deformation of said side walls to shed said ground-engaging load laterally to adjacent said tire elements.

2. A composite tire according to claim 1 wherein each said tire element is configured to be chevron-shaped.

3. A composite tire according to claim 1 comprising securing means to secure each ground-engaging element against said wheel rim, said securing means extending through openings in said ground-engaging element located in said circumferentially displaced formation and adjacent said element ends to hold said element against said rim in the vicinities of said openings.

4. A composite tire according to claim 1 comprising a mounting plate for each ground-engaging element, said mounting plate fitting within said tubular ground-engaging element, and comprising clamping means to secure said mounting plate and clamp said ground-engaging element against said wheel rim, wherein said mounting plate and clamping means lie wholly between said element ends, in an axial sense when clamping said element to said rim.

5. A wheel rim and composite tire according to claim 1 said multiple ground-engaging elements being assembled around said wheel rim in interlocking relationship.

6. A wheel rim and composite tire according to claim 4 said multiple ground-engaging elements being assembled around said wheel rim in interlocking relationship and said mounting plates and clamping means lying wholly between said element ends.

* * * * *